US011316695B2

(12) United States Patent
Whitcomb

(10) Patent No.: US 11,316,695 B2
(45) Date of Patent: Apr. 26, 2022

(54) SYSTEM AND METHOD FOR PROVIDING AND MAINTAINING IRREFUTABLE PROOF OF THE BUILDING, TESTING, DEPLOYMENT AND RELEASE OF SOFTWARE

(71) Applicant: Intuit Inc., Mountain View, CA (US)

(72) Inventor: Thomas Whitcomb, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 96 days.

(21) Appl. No.: 16/400,086

(22) Filed: May 1, 2019

(65) Prior Publication Data

US 2020/0351099 A1 Nov. 5, 2020

(51) Int. Cl.
*G06F 8/60* (2018.01)
*H04L 9/32* (2006.01)
*G06F 8/70* (2018.01)
*G06F 11/36* (2006.01)
*H04L 9/06* (2006.01)

(52) U.S. Cl.
CPC .............. *H04L 9/3236* (2013.01); *G06F 8/60* (2013.01); *G06F 8/70* (2013.01); *G06F 11/3672* (2013.01); *H04L 9/0637* (2013.01); *H04L 2209/38* (2013.01)

(58) Field of Classification Search
CPC ....... H04L 9/06; H04L 9/0618; H04L 9/0637; H04L 9/3236; H04L 9/3247; H04L 2209/38; G06F 8/60; G06F 8/70; G06F 8/71
See application file for complete search history.

(56) References Cited

U.S. PATENT DOCUMENTS

| | | | | |
|---|---|---|---|---|
| 9,773,264 | B2 * | 9/2017 | Brown | G06Q 30/0601 |
| 10,339,332 | B1 * | 7/2019 | Bendory | G06F 8/433 |
| 2016/0342977 | A1 * | 11/2016 | Lam | G06Q 20/0658 |
| 2017/0123777 | A1 * | 5/2017 | Mittal | G06F 8/71 |
| 2017/0243193 | A1 * | 8/2017 | Manian | G06Q 20/3829 |
| 2018/0060836 | A1 * | 3/2018 | Castagna | G06Q 20/10 |
| 2018/0089256 | A1 * | 3/2018 | Wright, Sr. | G06Q 20/1235 |
| 2018/0189732 | A1 * | 7/2018 | Kozloski | G06F 8/71 |
| 2018/0253464 | A1 * | 9/2018 | Kohli | G06F 16/219 |
| 2019/0065733 | A1 * | 2/2019 | Forehand | G06Q 30/02 |
| 2019/0104125 | A1 * | 4/2019 | Dearment | G06F 9/468 |
| 2019/0205121 | A1 * | 7/2019 | Ericson | H04L 9/0643 |

(Continued)

OTHER PUBLICATIONS

Cabanes, Benjamin "Things you probably didn't know about Git", [Online], Apr. 8, 2018 [Retrieved on: Oct. 17, 2021], www.medium.com, Retrieved from: < https://medium.com/@bencabanes/things-you-probably-didnt-know-about-git-f0fbdb86a071 > (Year: 2018).*

(Continued)

*Primary Examiner* — Eric W Shepperd
(74) *Attorney, Agent, or Firm* — DLA Piper LLP (US)

(57) ABSTRACT

A system and method for providing and maintaining irrefutable proof of the building, testing, deployment and release of a software product. The system and method provide a secure, immutable electronic ledger to be accessed by various services and systems during the software product's development and release cycle. The ledger may be implemented using electronic blocks linked together via cryptography.

19 Claims, 6 Drawing Sheets

(56) References Cited

U.S. PATENT DOCUMENTS

| | | | | |
|---|---|---|---|---|
| 2019/0303541 | A1* | 10/2019 | Reddy | H04L 9/0643 |
| 2019/0384594 | A1* | 12/2019 | Michiyama | H04L 9/3247 |
| 2020/0099688 | A1* | 3/2020 | Anders | G06N 20/00 |
| 2020/0142693 | A1* | 5/2020 | Neugschwandtner | G06F 16/2379 |
| 2020/0210170 | A1* | 7/2020 | Johnson | H04L 9/3239 |
| 2020/0336542 | A1* | 10/2020 | Wang | H04L 9/0643 |
| 2020/0372158 | A1* | 11/2020 | Wang | G06F 8/65 |

OTHER PUBLICATIONS

Pranavk "What does a git SHA depend on?" [Online], May 23, 2017 [Retrieved on: Oct. 17, 2021], www.stackoverflow.com, Retrieved from: < https://stackoverflow.com/questions/32854571/what-does-a-git-sha-depend-on > (Year: 2017).*

International Search Report dated Jan. 22, 2020 issued in PCT/US2019/043781 filed Jul. 26, 2019.

Written Opinion dated Jan. 22, 2020 issued in PCT/US2019/043781 filed Jul. 26, 2019.

Mylrea et al., "Blockchain for Supply Chain Cybersecurity, Optimization and Compliance", 2018 Resilience Week (RWS), IEEE, Aug. 20, 2018, pp. 70-76.

Ulybyshev et al., "(WIP) Blockhub: Blockchain-Based Software Development System for Untrusted Environments", 2018 IEEE 11$^{th}$ International Conference on Cloud Computing (CLOUD), IEEE, Jul. 2, 2018, pp. 582-585.

"Blockchain in Software Development" ip.com journal, ip.com, Feb. 5, 2019, 3 pages.

* cited by examiner

SYSTEM AND METHOD FOR PROVIDING AND MAINTAINING IRREFUTABLE PROOF OF THE BUILDING, TESTING, DEPLOYMENT AND RELEASE OF SOFTWARE

DETAILED DESCRIPTION OF SEVERAL EMBODIMENTS

Figure 1:
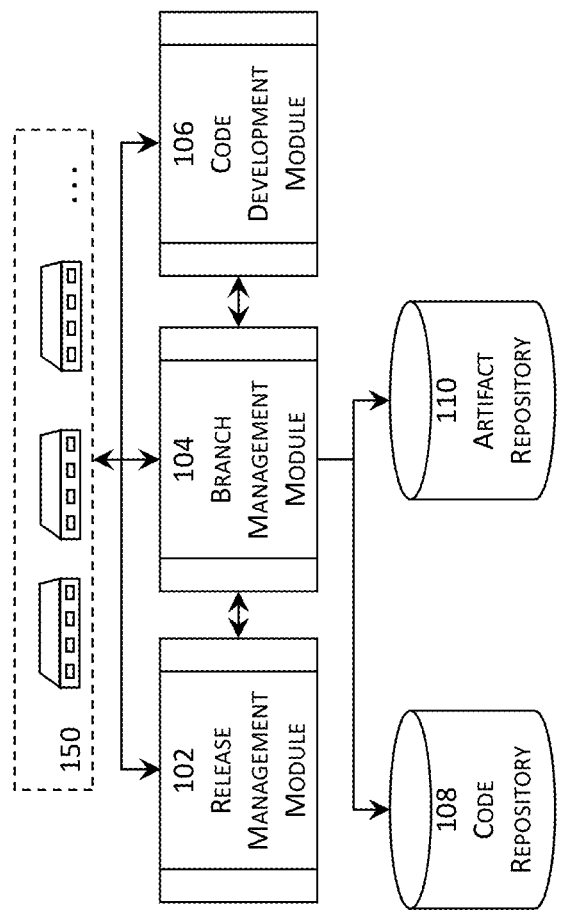
FIG. 1 shows a system for providing and maintaining irrefutable proof of the building, testing, deployment and release of a software product according to an embodiment of the present disclosure.

Embodiments described herein may be configured to provide and maintain irrefutable proof of when, what, where and by whom transactions/activities related to the building, testing, deployment and release of a software product were performed. In addition, the disclosed embodiments may be configured to provide, via an immutable electronic ledger that may be inspected by auditors and compliance organizations, an audit trail of the transactions/activities associated with the software product, what the transactions/activities were, when they were made and by whom.

It is known in the art that a release cycle for a software product (i.e., a "software release cycle") includes multiple stages such as e.g., planning, defining, designing, building, testing, deployment and release to production and or the public. The cycle may include e.g., a series of development releases that occur nightly, an alpha release, a beta release, a release to manufacturing, and a release to production, to name a few.

Build management is the process by which a software product is built and managed. As can be appreciated, build management for a software product with the typical release cycle requires a joint effort involving multiple teams such as a development team, quality team, and various test or inspection teams, to name a few. A conventional software product release therefore requires a substantial amount of manual and tedious efforts in creating, maintaining, bookkeeping, communicating, and coordinating the various intermediate products and builds, and their testing, among these teams. The teams are typically distributed over e.g., a cloud-based network where the resources are loosely coupled and security must be maintained at all times. Moreover, due to the distributed nature of the parties involved, there currently is no single, consolidated ledger or log that system managers, auditors and national compliance standards organizations can rely upon for the irrefutable proof of who, what, when and where a piece of software was built, tested, deployed and released to production (and non-production) environments. Irrefutable proof is required, among other things, to ensure that nothing has been tampered with during the software release cycle, which may be required for quality assurance purposes and/or to satisfy government or other standards.

Accordingly, there is a need and desire for a method and system for securing, monitoring and auditing the various transactions/activities of a software release cycle that address at least the aforementioned challenges.

An example process of establishing and maintaining irrefutable proof of transactions/activities that occur during a software release cycle may be performed as follows. A computing device creates an electronic ledger that may be stored in a database accessible over one or more networks. In one embodiment, the ledger is implemented as a plurality of electronic blocks linked together via cryptography such as e.g., hashing and digital signatures. In one embodiment, the ledger may be implemented using blockchain or similar technologies. The computing device or one or more additional computing devices, when performing a transaction/activity related to the software release cycle, may access the electronic ledger to record the transaction/activity performed and when it was performed. When the ledger is implemented as a plurality of blocks, the one or more additional computing devices may link a new block to a last block in the ledger. Cryptography may be used to ensure that the contents of the blocks are immutable, providing proof of the identity of the performer of the transaction/activity associated with the block as well as providing a time stamp and an audit trail for the chain of title for the software release cycle.

FIG. 1 shows a system 100 configured to provide and maintain irrefutable proof of the building, testing, deployment and release of a software product according to an embodiment of the present disclosure. As used herein, the term "software product" encompasses any software that is built, tested, deployed and/or released in any form, including a downloadable software application and software stored and delivered on a computer readable medium.

In one embodiment, the system 100 may comprise a plurality of computing systems 150 operated by various members among multiple teams involved in the software release cycle such as the one described above. For example, the a plurality of computing systems 150 may access a release management module 102 that may control and manage various aspects of multiple releases of a software product from the pre-alpha release all the way through the production release. The plurality of computing systems 150 may also access a branch management module 104 that may, for a software release cycle, generate, control, and manage a master branch with a unique master identifier for the release of the software product as well as a plurality of additional branches such as one or more feature branches, one or more release branches, etc. that bifurcate from the master branch.

The identification of each branch may also be subject to the control and management of the branch management module 104 so that possible conflicts may be eliminated, and versioning of any aspects of the software product may be controlled. The identifications of branches may be stored in a branching repository (not shown) that is also accessible by the release management module 102 and one or more code development modules 106 for integration with the branch management module 104 as well any deployment modules (not shown). The branch management module 104 may track some or all deployable or non-deployable artifacts and functions in tandem with the release management module 102 to fill or augment a releasable version of the product such that it includes everything (e.g., artifacts) to support a deployment and release.

In addition, the plurality of computing systems 150 may access one or more code development modules 106 that may be used to create, control, or manage deployable artifacts included in one or more releases, non-deployable artifacts that are not included in the one or more releases, but may be used for reference purposes. The branch management module 104 is communicably coupled with the release management module 102 and the one or more code development modules 106 to collaboratively package and store a release of a software application into one or more box sets, including information of a plurality of artifacts into an artifacts repository 110.

In some embodiments, either or both of the code repository 108 and the deployment repository 110 is a cloud-based source control repository hosting service that offers distributed version control and source code management functionalities as well as role-based features.

In some embodiments, either or both of the code repository 108 and the deployment repository 110 can include all or part of an electronic ledger (discussed below in more detail) maintained and utilized in accordance with the disclosed principles. Each of the plurality of computing systems 150 may access, write to and add to the electronic ledger during the course of the release cycle (described in more detail below), providing an electronic chain of title for transactions/activities performed during the cycle. As discussed below in more detail, the electronic ledger mat be implemented using of blockchain or other similar technology to ensure that the contents of the ledger are immutable (e.g., by providing proof of the identity of the performer of the transaction/activity as well as providing a time stamp and an audit trail for the chain of title for the software release cycle).

Figure 2:
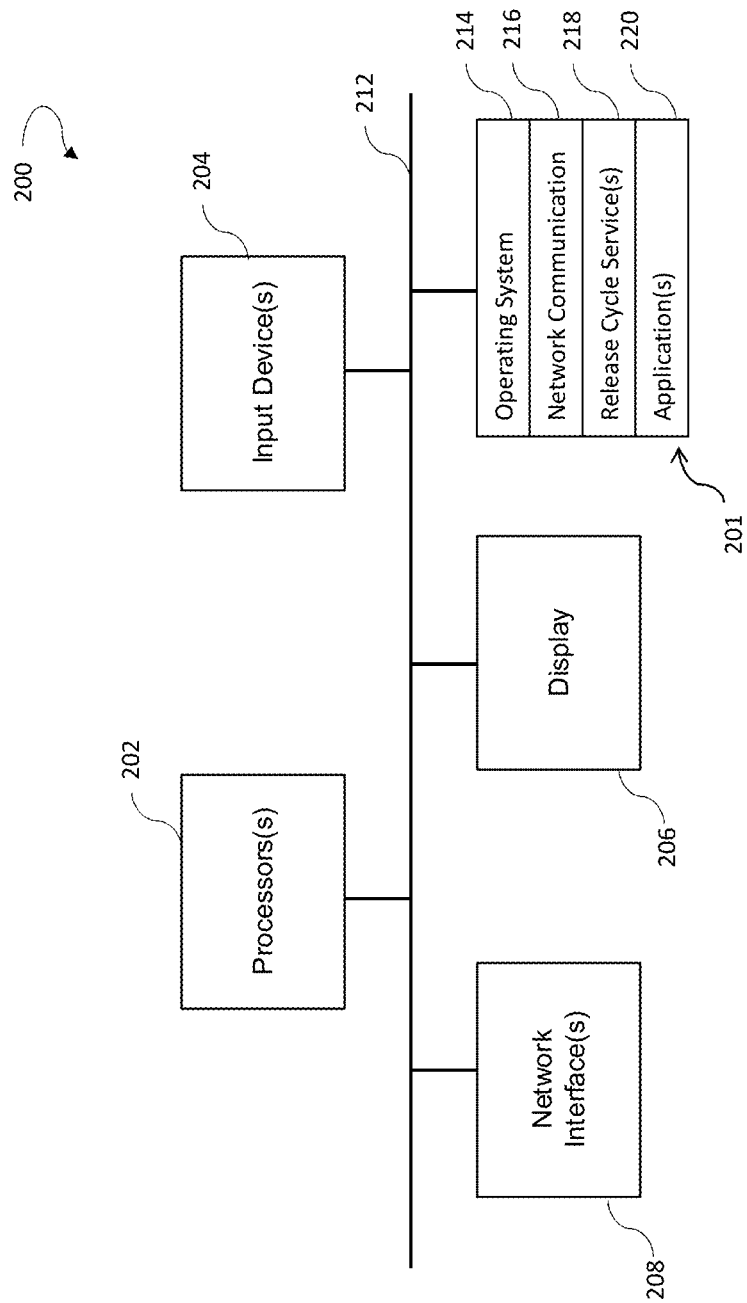
FIG. 2 shows a server device according to an embodiment of the present disclosure.

FIG. 2 is a block diagram of an example computing device 200 that may implement various features and processes as described herein. For example, computing device 200 may function as one of the plurality of computing systems 150 and/or it may implement on or more of the release management module 102, branch management modules 104, or code development modules 106, or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable mediums 201. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA Industry Standard Architecture), EISA (Extended Industry Standard Architecture), PCI (Peripheral Component Interconnect), PCI Express, NuBus, USB (Universal Serial Bus), Serial ATA (Advanced Technology Attachment) or FireWire. Computer-readable medium 201 may be any medium that participates in providing instructions to processor(s) 202 for execution, including without limitation, non-volatile storage media (e.g., optical disks, magnetic disks, flash drives, etc.), or volatile media (e.g., SDRAM (Synchronous Dynamic Random Access Memory), ROM (Read-Only Memory), etc.).

Computer-readable medium 201 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 201; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP (Transmission Control Protocol/Internet Protocol), HTTP (Hypertext Transfer Protocol), Ethernet, telephony, etc.).

Release cycle service(s) instructions 218 may include instructions required to implement one of the release management module 102, branch management modules 104, or code development modules 106, or any of the software release cycle transactions/activities performed by the plurality of computing systems 150, including accessing and adding to the electronic ledger, as described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM (Erasable Programmable Read-Only Memory), EEPROM (Electrically Erasable Programmable Read-Only Memory), and flash memory devices; magnetic disks such as internal hard disks and removable disks; magneto-optical disks; and CD-ROM (Compact Disc Read-Only Memory) and DVD-ROM (Digital Versatile Disc Read-Only Memory) disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN (Local Area Network), a WAN (Wide Area Network), and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API (Application Programming Interface). An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
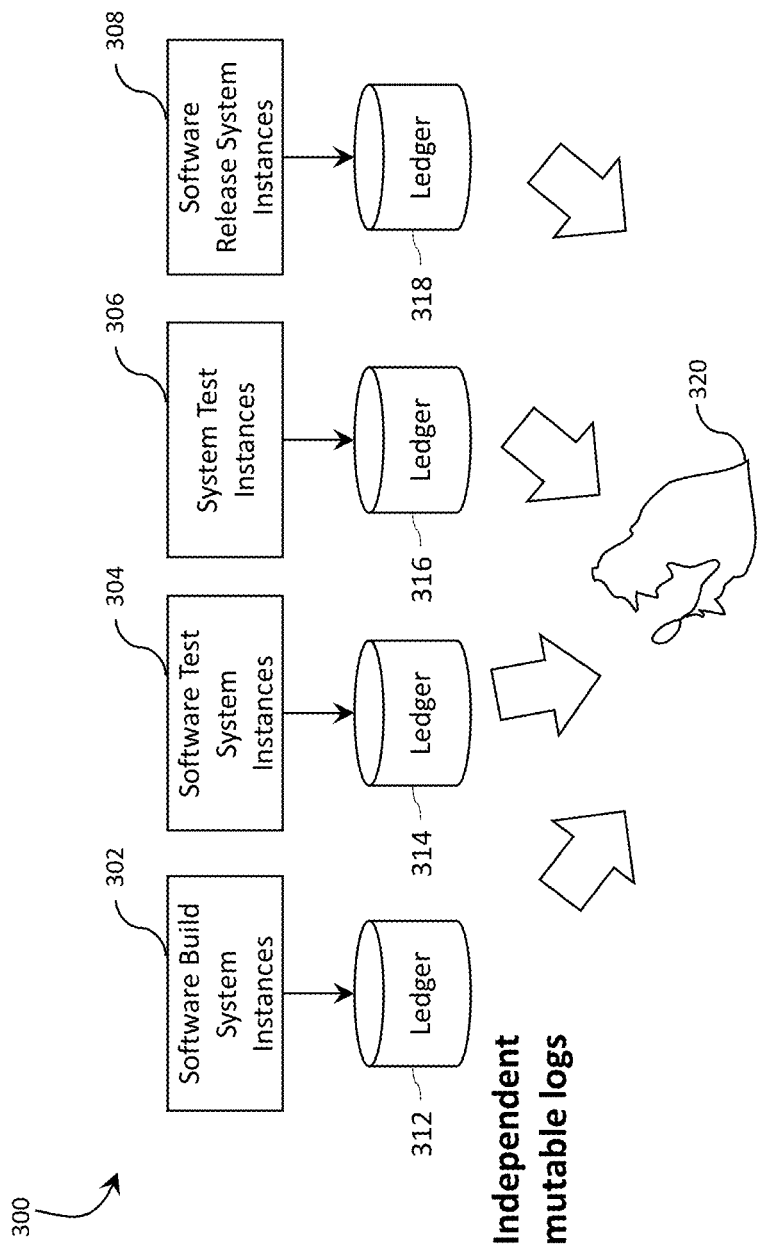
FIG. 3 shows at a high level a system comprising a plurality of program instances associated with the participants/systems that may be involved in a software release cycle.

FIG. 3 shows at a high level a system 300 comprising a plurality of program instances associated with the participants/systems that may be involved in a software release cycle. For example, the system 300 may include software build system instances 302, software test system instances 304, system test instances 306, and software release system instances 308, to name a few. The illustrated software build system instances 302, software test system instances 304, system test instances 306, and software release system instances 308 may be executed on one or more of the plurality of computing systems 150 and may be part of one or more of the release management module 102, branch management modules 104, or code development modules 106.

The software build system instances 302 may include the instances responsible for updating the software code and artifacts for a software product. As shown in FIG. 3, a first ledger 312 may be accessed and maintained by the software build system instances 302. The software test system instances 304 may include the instances responsible for testing some or all of the software within a build. A second ledger 314 may be accessed and maintained by the software test system instances 304.

The system test instances 306 may include the instances responsible for testing the software product as a whole or in the system environment it is supposed to operate within. A third ledger 316 may be accessed and maintained by the system test instances 306. The software release system instances 308 may include the instances responsible for releasing the software build and its related artifacts. A fourth ledger 318 may be accessed and maintained by the software release system instances 308.

Each ledger 312, 314, 316, 318 is maintained separately by its associated instance 302, 304, 306, 308, or the computer system 150 the instance is operating on. As can be appreciated, there are several disadvantages to having separate ledgers 312, 314, 316, 318 for the software release cycle. First, a substantial amount of manual and time wasting efforts are required to create and maintain the various ledgers 312, 314, 316, 318. Second, there is no proper and secure measure for coordinating and resolving conflicts among the ledgers and therefore the intermediate products, testing, builds and artifacts. That is, it is difficult to determine which actions occurred first and which artifacts are the latest and correct artifacts for the build. Moreover, without a mechanism for ensuring the integrity of the ledgers 312, 314, 316, 318 and their contents, the ledgers 312, 314, 316, 318 are mutable because their properties, data and fields can be modified after their creation. Thus, team personnel, auditors and national compliance standards organizations (shown as an inspector 320 in FIG. 3) do not have irrefutable proof of who, what, when and where a piece of software has been built, tested, deployed and released to production (and non-production) environments. As can be appreciated, irrefutable proof is required, among other things, to ensure that nothing has been tampered with during the software release cycle, which may be required for quality assurance purposes and/or to satisfy government or other standards.

Figure 4:
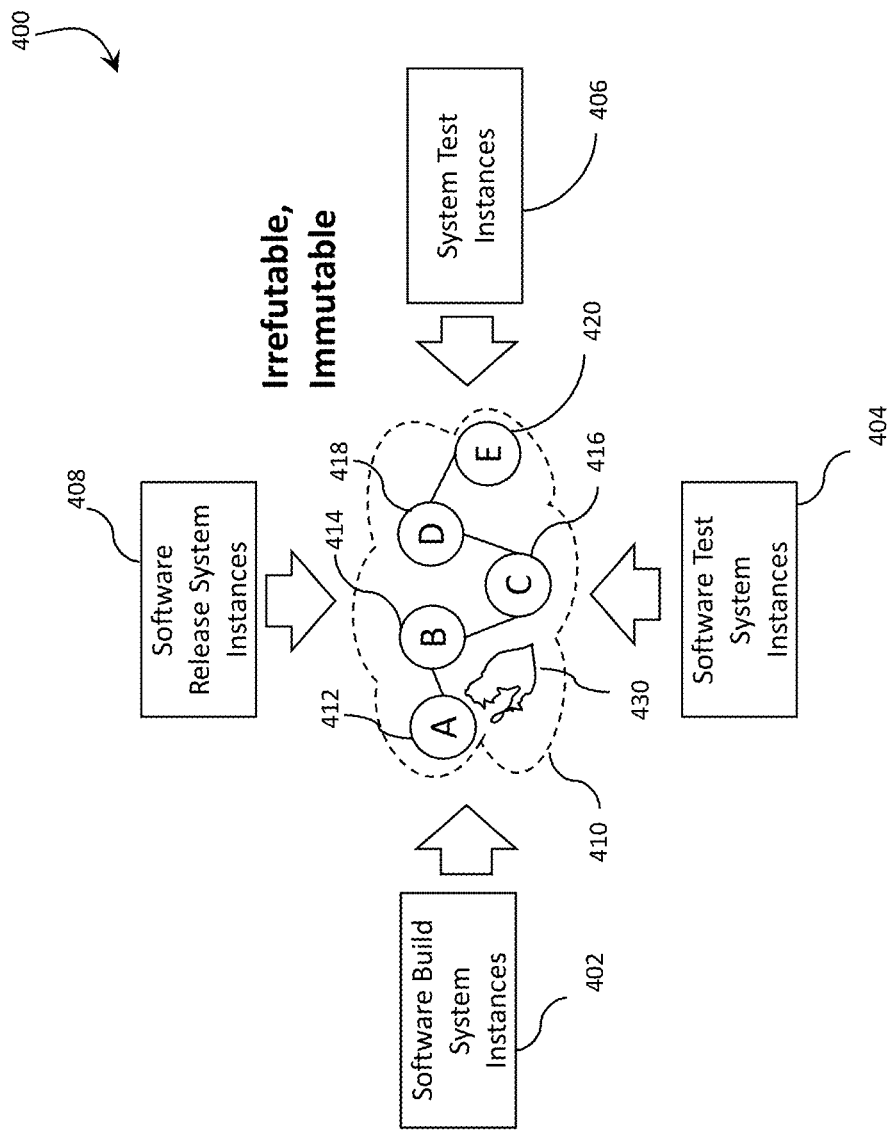
FIG. 4 shows at a high level an example system comprising a plurality of program instances associated with the participants/systems that may be involved in a software release cycle and further comprising an irrefutable, immutable electronic ledger according to an embodiment of the present disclosure.

FIG. 4 shows at a high level an example system 400 comprising a plurality of program instances associated with the participants/systems that may be involved in a software release cycle and further comprising an irrefutable, immutable electronic ledger according to an embodiment of the present disclosure. In essence, the stages of the software release cycle are viewed as a supply chain problem. For example, each step in the cycle is decoupled from the other steps, but yet there exists a need for confidence and assurance that the steps are executed in order and the output of one step becomes the input to the next step without tampering. Additionally, there is a need to look backwards in time to reconstruct the process flow for auditing, quality assurance, and service level agreement purposes, to name a few.

In accordance with the disclosed principles, a secured, electronic ledger 410 that can be accessed and shared by the participants/systems involved in the software release cycle may be utilized to overcome the above-noted deficiencies. Thus, it is possible to ensure that every transaction/activity within the cycle is completed with integrity and isolation from other participants/systems within the cycle. In one example embodiment, the electronic ledger may be implemented using cryptography such as e.g., digital hashing and digital signatures, which may form the backbone of the desired security and identification features. In one embodiment, the ledger may be implemented using blockchain or similar technologies. As such, a software product may be built, tested, deployed and released with confidence that software artifacts were not tampered with and that each participant in release cycle was the expected participant (i.e., a members only network).

For example, as shown in FIG. 4, the system 400 may include software build system instances 402, software test system instances 404, system test instances 406, and software release system instances 408, to name a few. The illustrated software build system instances 402, software test system instances 404, system test instances 406, and software release system instances 408 may be executed on one or more of the plurality of computing systems 150 and may be part of one or more of the release management module 102, branch management modules 104, or code development modules 106.

The software build system instances 402 may include the instances responsible for updating the software code and artifacts for a software product. The software test system instances 404 may include the instances responsible for testing some or all of the software within a build. The system test instances 406 may include the instances responsible for testing the software product as a whole or in the system environment it is supposed to operate within. The software release system instances 408 may include the instances responsible for releasing the software build and its related artifacts.

Unlike the system 300 illustrated in FIG. 3, the system 400 of the illustrated embodiment utilizes a coordinated and immutable electronic ledger 410 that is accessed by and maintained by all of the instances 402, 404, 406, 408 or their respective computer systems 150. In one embodiment, the ledger 410 may be implemented using blockchain technology. That is, the ledger 410 may be implemented as a growing list of blocks 412, 414, 416, 418, 420 that are linked together using cryptography (e.g., digital hashing and digital signatures). In the illustrated example, each block 412, 414, 416, 418, 420 may contain a cryptographic hash or digital signature of the previous block, a timestamp, and transaction data (represented e.g., as a merkle tree root hash).

As is known in the art, a blockchain is resistant to modification of its data and is therefore immutable. Moreover, each transaction is recorded in an efficient, verifiable and permanent manner, making the ledger 410 irrefutable as well. The ledger 410, when implemented as a blockchain, may be managed by one or more of the computer systems 150, the release management module 102, branch management modules 104, or code development modules 106, as e.g., a peer-to-peer network collectively adhering to a protocol for inter-network communications and validating new blocks. Once recorded, the data in any given block 412, 414, 416, 418, 420 cannot be altered retroactively without alteration of all subsequent blocks 412, 414, 416, 418, 420, which requires consensus of the network majority. This way, the ledger 410 may be distributed across one or more computer systems 150, but yet remain immutable and therefore its contents may serve as irrefutable proof for the software release cycle.

In accordance with the disclosed principles, a blockchain-based ledger 410 may offer the following advantages to the software release cycle:

Consensus: For any software release transaction to be valid, all systems/participants in the software release cycle must agree on its validity.

Provenance: Each system/participant in the software release cycle in the process knows where the deployment or other artifact came from and how its ownership changed over time.

Immutability: No system/participant in the software release cycle can tamper with a release transaction after it has been recorded in the ledger 410.

Finality: A single, shared ledger 410 provides one place to go to determine the ownership of an artifact or the completion of a release transaction.

The illustrated system 400 may implement conventional blockchain features such as resolving conflicts using the proof-of-work technique, which declares the chain/block with the most cumulative proof-of-work to be the valid chain/block. Various techniques for proof-of-work may be employed including Byzantine Fault Tolerant (BFT) mechanisms, examples of which include currently available products such as e.g., Raft and Juno.

The type of data that may be managed in the blocks 412, 414, 416, 418, 420 within the ledger 410 could be:

The initial SHA (secure hash algorithm) identifier of the source code from the Git repository.

The secure hash of the build artifact.

The location of the artifact.

The timestamp of the start and end of each transaction.

The unique identifier of the build, deploy and release requester.

Secure hashes of intermediate listings of build and deployment specifics and the locations of the listings.

Figure 5:
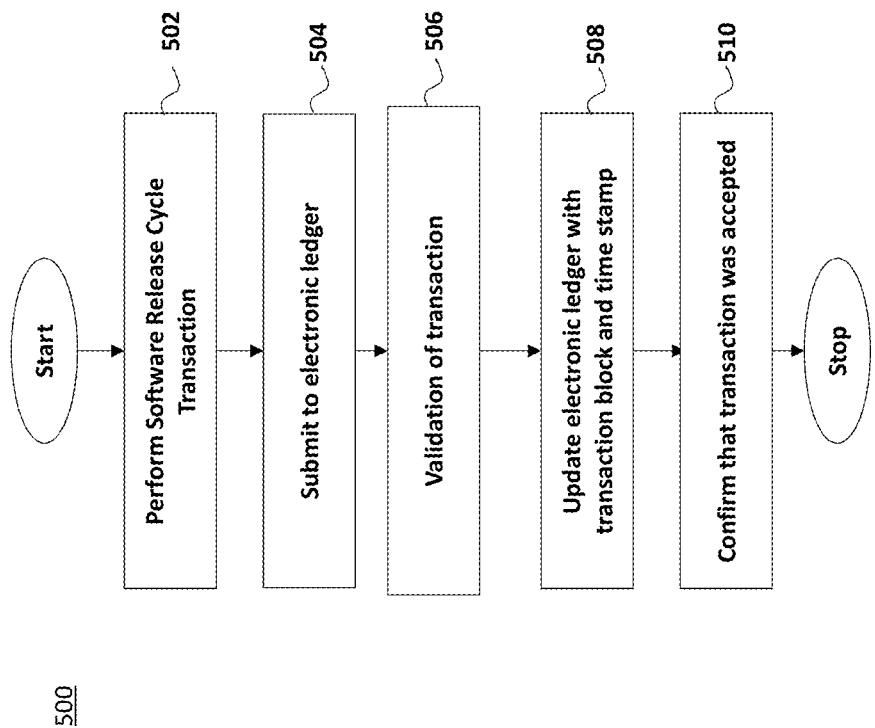
FIG. 5 shows an example process for recording transactions/activities associated with the software release cycle according to an embodiment of the present disclosure.

FIG. 5 shows an example process 500 for recording transactions/activities associated with the software release cycle according to an embodiment of the present disclosure. At step 502, one of the software build system instances 402, software test system instances 404, system test instances 406, and/or software release system instances 408 via one or more of the plurality of computing systems 150 or the release management module 102, branch management modules 104, or code development modules 106 performs a transaction/activity associated with the software release cycle. As noted above, the transaction/activity could be a transaction/activity related to the building, testing, deployment and release of a software product. The transaction/activity may also result in new code being deposited into the code repository 108 and or artifacts being deposited into the artifacts repository 110.

Upon completion of the transaction/activity, the performer of the transaction (via its computing system 150, software instance, module, etc.) submits a notification of the transaction/activity to the electronic ledger (e.g., ledger 410) at step 504. The notification will be reviewed by the members of the peer-to-peer network established for the system 100 discussed above. The notification may include the description of the transaction/activity, when it occurred, what device or system performed it, an identification of the performer of the transaction/activity and any other agreed upon information required to validate transactions/activities for the ledger.

At step 506, the members of the peer-to-peer network established for the system 100 perform a validation process based on the received notification. The validation process can be any suitable and/or agreed upon process for validating the transaction/activity (e.g., proof of work). Once validated, the electronic ledger is updated at step 508. In accordance with the disclosed principles, the ledger may be updated by adding a new block and the contents of the transaction/activity discussed above (e.g., initial SHA (Secure Hash Algorithm) identifier of the source code from the Git repository; secure hash of the build artifact; location of the artifact; timestamp of the start and end of each transaction; unique identifier of the build, deploy and release requester; secure hashes of intermediate listings of build and deployment specifics and the locations of the listings). Moreover, the new block is linked to the prior block using e.g., cryptography (e.g., digital hashing and digital signatures) as discussed above.

At step 510, a notification that the transaction/activity was added to the ledger may be sent to the software build system instances 402, software test system instances 404, system test instances 406, and/or software release system instances 408 via one or more of the plurality of computing systems 150 or the release management module 102, branch management modules 104, or code development modules 106 that performed the transaction/activity at step 502. The notification can be provided to the other members of the peer-to-peer network established for the system 100, if desired and or agreed upon by the members. As such, the method 500 (at step 510) can confirm that the transaction was accepted via the notification.

As can be appreciated, by following the process 500 and using the system 400, the disclosed principles may ensure that every transaction/activity within the software release cycle is completed with integrity and isolation from other participants/systems within the cycle. That is, a software product may be built, tested, deployed and released with confidence that software artifacts were not tampered with and that each participant in release cycle was the expected participant (i.e., a members only network). Cryptography may be used to ensure that the contents of the blocks are immutable, providing irrefutable proof of the identity of the performer of the transaction/activity associated with the block as well as providing a time stamp and an audit trail for the chain of title for the software release cycle.

Figure 6:
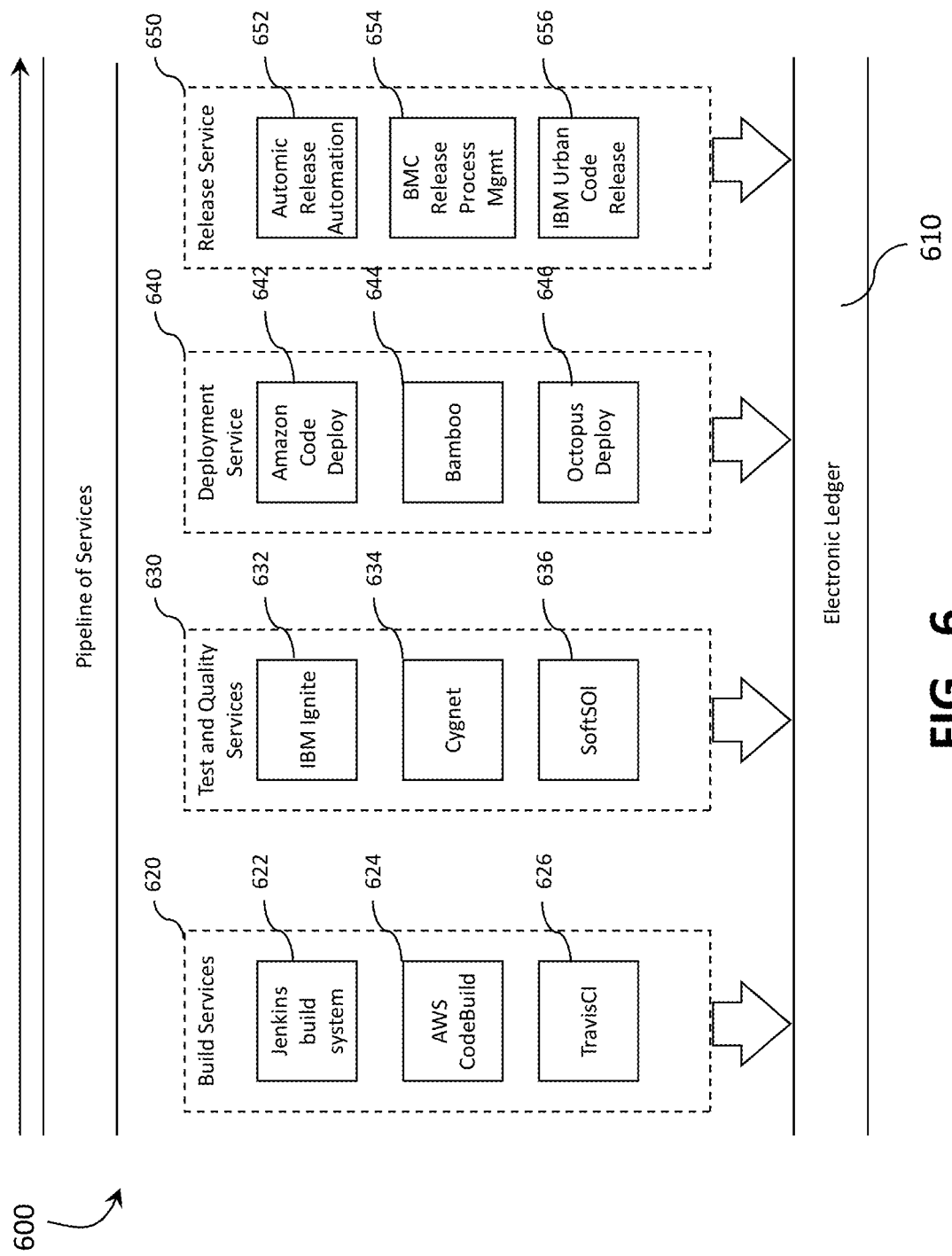
FIG. 6 shows in block diagram form an example software release cycle pipeline of services associated with the software release cycle according to an embodiment of the present disclosure.

FIG. 6 shows an example software release cycle pipeline of services 600, and example software services 620, 630, 640, 650 associated with the software release cycle, according to an embodiment of the present disclosure. For example, the pipeline 600 may include build services 620, test and quality services 630, deployment services 640 and release services 650. As shown in the example embodiment, the build services 620, test and quality services 630, deployment services 640 and release services 650 each have access to the same electronic ledger 610, which in the illustrated example is implemented using blockchain technology as discussed above.

As illustrated, the software release cycle flows from left to right in the pipeline 600, starting with the build services 620 and ending with the release services 650. Depending upon the complexity of the software being released, the pipeline 600 could consist of multiple test and deployment steps. The illustrated pipeline 600 consists of various build, test, deployment and release services available in the market place. It should be appreciated that any of these could be combined to construct a software release system. As such, and as explained above, it is critical to provide a way to track and audit the release process. As can be appreciated, the ledger 610 ensures the actors, artifacts and flow of the release process is what was intended. Thus, providing irrefutable proof that there were no interlopers involved in the process and that no steps were skipped.

As shown in the illustrated example, the build services 620 may include one or more of a Jenkins build system 622, Amazon Web Services (AWS) Codebuild 624, and/or a Travis CI (continuous integration) service. As known in the art, Jenkins is an open source automation server, providing tools and plugins to support the building, deployment and automation of a software product. An AWS Codebuild provides for the building and testing of code in a cloud-based environment. Travis CI is a hosted, distributed continuous integration service used to build and test software projects.

As shown in the illustrated example, the test and quality services 630 may include one or more of IBM IGNITE 632, Cygnet 634 and or SoftSol 636 services. As is known in the art, IBM IGNITE 632, Cygnet 634 and or SoftSol 636 services are services providing testing and quality assurance services for a software build.

As shown in the illustrated example, the deployment services 640 may include one or more of AMAZON CodeDeploy 642, Bamboo 644 and or Octopus Deploy 646 services. As is known in the art, each of AMAZON CodeDeploy 642, Bamboo 644 and or Octopus Deploy 646 are services that automate software deployments to a variety of computer systems and services.

As shown in the illustrated example, the release services 650 may include one or more of Automic Release Automation 652, BMC Release Process Management 654 and/or IBM URBANCODE RELEASE 656. As is known in the art, release services, among other things, manage the release of software, infrastructure changes and simultaneous deployments of multiple software products/applications.

It should be appreciated that while FIG. 6 illustrates various known and/or commercial versions of specific systems, products and or applications within the build services 620, test and quality services 630, deployment services 640 and release services 650 and ledger 610, the disclosed principles are not to be limited to these specific examples.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method of providing and maintaining irrefutable proof of transactions within a software release cycle, said method comprising:
creating, by one or more computer devices that are associated with the software release cycle, an electronic ledger;
storing the electronic ledger in an electronic database accessible by the one or more computer devices over one or more networks; and
for each transaction within the software release cycle, each computing device of the one or more computing devices is adapted to:
perform a transaction related to the software release cycle,
access the electronic ledger to record the transaction performed and when the transaction was performed in accordance with a predetermined procedure, information recorded in the ledger comprising a unique identifier of a requestor of a software build, deployment or release, a computing device identifier of a respective computing device that performed the transaction, and a cryptographic hash function identifier of source code associated with the transaction; and
provide an audit trail of the transaction and at least one other transaction recorded in the electronic ledger to satisfy at least one criteria associated with the software release cycle.

2. The method of claim 1, wherein the electronic ledger is implemented as a plurality of electronic blocks, each block comprising details of a performed transaction.

3. The method of claim 2, wherein the plurality of blocks are linked together by cryptography such that each subsequent block contains a cryptographic identifier of a previous block.

4. The method of claim 2, wherein the plurality of blocks are linked together by digital hashing such that each subsequent block contains a digital hash of an identifier of a previous block.

5. The method of claim 2, wherein the plurality of blocks are linked together by digital signatures such that each subsequent block contains a digital signature of a previous block.

6. The method of claim 1, wherein the electronic ledger is implemented as a blockchain comprising one or more blocks associated with a performed transaction, each block comprising details of a performed transaction.

7. The method of claim 1, wherein the performed transaction comprises one of a build service, test and quality service, deployment service or release service.

8. The method of claim 1, wherein information of the transaction performed and when the transaction was performed is stored within the electronic ledger.

9. The method of claim 8, wherein the information stored in the ledger comprises one or more of a secure hash of a build artifact; a location of the build artifact; a timestamp of a start of the performed transaction; a timestamp of an end of the performed transaction; or secure digital hashes of intermediate listings of build and deployment specifics and the locations of the listings.

10. The method of claim 1, wherein each computing device of the one or more computing devices is further adapted to receive a notification confirming that the transaction was accepted in to the electronic ledger.

11. A system for providing and maintaining irrefutable proof of transactions within a software release cycle, said system comprising:
one or more computing devices associated with the software release cycle, each computing device comprising a processor and memory, the memory comprising instructions that when executed the processor of said one or more computing devices cause the processor of said one or more computing devices to perform transactions related to one of a build service, test and quality service, deployment service or release service;
an electronic ledger stored in an electronic database of a memory device accessible by the one or more computer devices over one or more networks; and
for each transaction within the software release cycle, the processor of each computing device of the one or more computing devices is adapted to:
perform a transaction related to the software release cycle,
access the electronic ledger to record the transaction performed and when the transaction was performed in accordance with a predetermined procedure, information recorded in the ledger comprising a unique identifier of a requestor of a software build, deployment or release, a computing device identifier of a respective computing device that performed the transaction, and secure cryptographic hash functions of intermediate listings of build and deployment specifics and the locations of the listings; and
provide an audit trail of the transaction and at least one other transaction recorded in the electronic ledger to satisfy at least one criteria associated with the software release cycle.

12. The system of claim 11, wherein the electronic ledger is implemented as a plurality of electronic blocks, each block comprising details of a performed transaction.

13. The system of claim 12, wherein the plurality of blocks are linked together by cryptography such that each subsequent block contains a cryptographic identifier of a previous block.

14. The system of claim 12, wherein the plurality of blocks are linked together by digital hashing such that each subsequent block contains a digital hash of an identifier of a previous block.

15. The system of claim 12, wherein the plurality of blocks are linked together by digital signatures such that each subsequent block contains a digital signature of a previous block.

16. The system of claim 11, wherein the electronic ledger is implemented as a blockchain comprising one or more blocks associated with a performed transaction, each block comprising details of a performed transaction.

17. The system of claim 11, wherein information of the transaction performed and when the transaction was performed is stored within the electronic ledger.

18. The system of claim 17, wherein the information stored in the ledger comprises one or more of an initial secure hash algorithm (SHA) identifier of source code associated with the transaction; a secure hash of a build artifact; a location of the build artifact; a timestamp of a start of the performed transaction; or a timestamp of an end of the performed transaction.

19. The system of claim 11, wherein the processor of each computing device of the one or more computing devices is further adapted to receive a notification confirming that the transaction was accepted in to the electronic ledger.

\* \* \* \* \*